(12) United States Patent
Berly et al.

(10) Patent No.: US 10,177,976 B2
(45) Date of Patent: Jan. 8, 2019

(54) SYSTEM AND METHOD FOR CONFIGURING NETWORK DEVICES

(71) Applicant: Arista Networks, Inc., Santa Clara, CA (US)

(72) Inventors: Mark Berly, Santa Clara, CA (US); Peter Sprygada, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/597,968

(22) Filed: May 17, 2017

(65) Prior Publication Data

US 2017/0250862 A1 Aug. 31, 2017

Related U.S. Application Data

(63) Continuation of application No. 14/927,164, filed on Oct. 29, 2015.

(51) Int. Cl.
  *G06F 15/16* (2006.01)
  *H04L 12/24* (2006.01)
  *H04L 29/08* (2006.01)

(52) U.S. Cl.
  CPC ...... *H04L 41/0806* (2013.01); *H04L 41/0843* (2013.01); *H04L 41/0859* (2013.01); *H04L 41/12* (2013.01); *H04L 67/34* (2013.01)

(58) Field of Classification Search
  USPC ........................................................ 709/217
  See application file for complete search history.

(56) References Cited

U.S. PATENT DOCUMENTS

| | | | | |
|---|---|---|---|---|
| 5,109,484 A | * | 4/1992 | Hughes | G06F 9/4411 709/222 |
| 5,519,878 A | * | 5/1996 | Dolin, Jr. | H04L 12/2803 709/220 |
| 5,580,177 A | * | 12/1996 | Gase | G06F 3/1204 358/1.15 |
| 5,613,160 A | * | 3/1997 | Kraslaysky | G06F 3/1293 358/1.15 |
| 5,655,148 A | * | 8/1997 | Richman | G06F 9/4411 710/11 |
| 5,668,992 A | * | 9/1997 | Hammer | G06F 9/4411 713/1 |
| 5,687,320 A | * | 11/1997 | Wiley | G06F 3/1293 707/999.01 |
| 5,692,111 A | * | 11/1997 | Marbry | G06F 3/1297 358/1.15 |
| 5,809,329 A | * | 9/1998 | Lichtman | G06F 15/177 710/15 |
| 5,832,191 A | * | 11/1998 | Thorne | G06F 9/5011 358/1.15 |
| 5,960,167 A | * | 9/1999 | Roberts | G06F 3/1294 358/1.15 |

(Continued)

*Primary Examiner* — Alicia Baturay
(74) *Attorney, Agent, or Firm* — Chamberlain, Drdlicka, White, Williams & Aughtry

(57) ABSTRACT

A method, version server, and non-transitory computer readable medium for configuring a network device. Configuring the network device may include obtaining, by a version server, a first configuration action; matching, by the version server, the first configuration action to a first entry of an action database of the version server; and sending, by the version server, a version controlled configuration action of the first entry.

19 Claims, 15 Drawing Sheets

(56) References Cited

U.S. PATENT DOCUMENTS

| | | | | |
|---|---|---|---|---|
| 5,980,078 A * | 11/1999 | Krivoshein | G05B 19/41865 | 700/1 |
| 6,021,429 A * | 2/2000 | Danknick | H04L 29/12009 | 709/208 |
| 6,074,434 A * | 6/2000 | Cole | G06F 8/64 | 717/170 |
| 6,091,508 A * | 7/2000 | Love | G06F 9/4411 | 358/1.1 |
| 6,112,256 A * | 8/2000 | Goffinet | G06F 3/1297 | 709/221 |
| 6,167,567 A * | 12/2000 | Chiles | G06F 9/454 | 717/173 |
| 6,178,468 B1 * | 1/2001 | Rudd | G06F 9/4413 | 707/999.1 |
| 6,219,700 B1 * | 4/2001 | Chang | H04L 41/044 | 709/222 |
| 6,269,481 B1 * | 7/2001 | Perlman | G06F 9/4415 | 707/999.1 |
| 6,301,012 B1 * | 10/2001 | White | G06F 3/1204 | 358/1.15 |
| 6,308,205 B1 * | 10/2001 | Carcerano | H04L 41/0253 | 709/220 |
| 6,349,304 B1 * | 2/2002 | Boldt | G06F 3/1204 |  |
| 6,362,894 B1 * | 3/2002 | Shima | G06F 3/1293 | 358/1.12 |
| 6,457,069 B1 * | 9/2002 | Stanley | G06F 9/4411 | 326/105 |
| 6,466,971 B1 * | 10/2002 | Humpleman | H04L 12/2803 | 709/203 |
| 6,493,751 B1 * | 12/2002 | Tate | H04L 41/0843 | 370/254 |
| 6,542,892 B1 * | 4/2003 | Cantwell | G06F 9/4411 |  |
| 6,542,928 B1 * | 4/2003 | Hammons | H04L 29/06 | 709/221 |
| 6,557,049 B1 * | 4/2003 | Maloy | G06F 1/181 | 709/221 |
| 6,564,337 B1 * | 5/2003 | Yoneda | H04L 69/16 | 714/4.1 |
| 6,577,907 B1 * | 6/2003 | Czyszczewski | H04N 1/00411 | 358/442 |
| 6,687,733 B2 * | 2/2004 | Manukyan | G06F 9/44505 | 709/200 |
| 6,693,722 B1 * | 2/2004 | Mixer, Jr. | G06K 15/00 | 358/1.13 |
| 6,694,290 B1 | 2/2004 | Apfelbaum et al. | | |
| 6,728,346 B2 * | 4/2004 | Czyszczewski | G06F 21/31 | 379/93.02 |
| 6,738,027 B1 * | 5/2004 | Doolittle | G06F 3/1446 | 345/1.1 |
| 6,779,004 B1 * | 8/2004 | Zintel | H04L 12/2803 | 709/227 |
| 6,789,111 B1 * | 9/2004 | Brockway | G06F 9/4411 | 709/203 |
| 6,809,830 B1 * | 10/2004 | Lafky | G06F 3/1204 | 358/1.13 |
| 6,810,420 B1 * | 10/2004 | Buse | H04L 29/12254 | 709/220 |
| 6,814,510 B1 * | 11/2004 | Sabbagh | G06F 3/1204 | 400/61 |
| 6,842,766 B2 * | 1/2005 | Brockway | G06F 9/4411 | 709/203 |
| 6,859,827 B2 * | 2/2005 | Banginwar | H04L 41/12 | 709/203 |
| 6,867,876 B1 * | 3/2005 | Czyszczewski | H04N 1/00204 | 358/1.13 |
| 6,892,230 B1 * | 5/2005 | Gu | H04L 12/2805 | 370/254 |
| 6,892,299 B2 * | 5/2005 | Abe | G06F 9/4411 | 709/200 |
| 6,910,064 B1 * | 6/2005 | Astarabadi | H04L 29/06 | 709/203 |
| 6,910,068 B2 * | 6/2005 | Zintel | H04L 12/2803 | 709/218 |
| 6,915,337 B1 * | 7/2005 | Motoyama | G06F 9/4411 | 709/220 |
| 6,915,514 B1 * | 7/2005 | Machida | G06F 9/4411 | 717/168 |
| 6,920,506 B2 * | 7/2005 | Barnard | H04L 29/12113 | 709/223 |
| 6,941,356 B2 * | 9/2005 | Meyerson | H04L 41/0809 | 370/254 |
| 6,961,336 B2 * | 11/2005 | Coggeshall | H04L 29/12018 | 370/218 |
| 6,963,417 B1 * | 11/2005 | Saito | H04N 1/00214 | 358/1.15 |
| 6,970,920 B2 * | 11/2005 | Poirier | H04L 29/06 | 709/217 |
| 7,080,371 B1 * | 7/2006 | Arnaiz | G06F 8/65 | 717/168 |
| 7,080,372 B1 * | 7/2006 | Cole | G06F 8/64 | 707/999.202 |
| 7,305,444 B2 | 12/2007 | Raguseo | | |
| 7,523,207 B2 | 4/2009 | Chen et al. | | |
| 7,577,812 B2 | 8/2009 | Fujibayashi et al. | | |
| 7,783,733 B1 * | 8/2010 | Yip | H04L 41/0213 | 709/220 |
| 7,840,957 B2 * | 11/2010 | Kumashiro | G06F 8/65 | 717/168 |
| 7,873,744 B2 | 1/2011 | Chen et al. | | |
| 7,885,256 B1 * | 2/2011 | Yenamandra | H04L 67/1097 | 370/389 |
| 7,886,031 B1 * | 2/2011 | Taylor | H04L 41/0873 | 709/220 |
| 7,912,926 B2 * | 3/2011 | Belgaied | H04L 41/28 | 707/609 |
| 7,936,671 B1 | 5/2011 | Mater et al. | | |
| 7,991,406 B2 * | 8/2011 | Korkalo | H04L 29/06 | 455/412.1 |
| 8,245,218 B2 * | 8/2012 | Giambalvo | G06F 8/61 | 717/172 |
| 8,316,224 B2 * | 11/2012 | Vidal | G06F 8/71 | 713/1 |
| 8,341,249 B2 * | 12/2012 | Rakowski | H04L 41/0803 | 709/217 |
| 8,443,361 B2 * | 5/2013 | Vidal | G06F 8/71 | 717/177 |
| 8,493,864 B1 | 7/2013 | Mater et al. | | |
| 8,522,232 B1 * | 8/2013 | Carter | G06F 8/654 | 717/173 |
| 8,555,273 B1 * | 10/2013 | Chia | G06F 8/654 | 717/173 |
| 8,612,553 B2 | 12/2013 | Phillips et al. | | |
| 8,769,522 B2 * | 7/2014 | Venkatraman | G06F 8/65 | 717/169 |
| 8,839,220 B2 * | 9/2014 | Carter | G06F 8/64 | 717/168 |
| 8,918,775 B1 * | 12/2014 | Carpenter | G06F 9/44505 | 709/203 |
| 8,934,340 B1 | 1/2015 | Mater et al. | | |
| 8,949,363 B2 * | 2/2015 | Gray | H04L 51/24 | 709/206 |
| 9,130,801 B1 * | 9/2015 | Carruth | H04L 29/08072 | |
| 9,134,989 B2 * | 9/2015 | Minear | G06F 8/65 | |
| 9,143,560 B2 * | 9/2015 | Koganti | G06F 17/30575 | |
| 9,268,630 B1 * | 2/2016 | Walston | G06F 8/65 | |
| 9,317,513 B1 * | 4/2016 | Bell | G06F 17/301 | |
| 9,503,391 B2 | 11/2016 | Xia et al. | | |
| 9,544,185 B1 | 1/2017 | Yadav et al. | | |
| 9,674,038 B2 | 6/2017 | Vorst et al. | | |
| 9,740,441 B2 * | 8/2017 | Chase | G06F 8/65 | |
| 9,774,739 B2 * | 9/2017 | Segre | H04M 3/5232 | |
| 9,888,405 B2 | 2/2018 | Edsall et al. | | |
| 2002/0101620 A1 * | 8/2002 | Sharif | H04N 1/00209 | 358/400 |
| 2003/0016393 A1 * | 1/2003 | Johnson | H04N 1/00209 | 358/402 |
| 2003/0018746 A1 * | 1/2003 | Boesch | G06F 8/63 | 709/218 |

(56) References Cited

U.S. PATENT DOCUMENTS

| | | | |
|---|---|---|---|
| 2003/0110270 A1* | 6/2003 | Copp | H04N 1/00204 709/228 |
| 2003/0145315 A1* | 7/2003 | Aro | G06F 9/541 717/170 |
| 2003/0158919 A1* | 8/2003 | Fomenko | G06F 8/60 709/220 |
| 2003/0160988 A1* | 8/2003 | Chapin | G06F 3/1204 358/1.13 |
| 2003/0160989 A1* | 8/2003 | Chapin | G06F 9/4411 358/1.13 |
| 2003/0195952 A1* | 10/2003 | Henry | H04L 29/06 709/220 |
| 2003/0200265 A1* | 10/2003 | Henry | H04N 1/00209 709/206 |
| 2003/0217282 A1* | 11/2003 | Henry | H04L 63/101 726/4 |
| 2003/0221190 A1* | 11/2003 | Deshpande | G06F 8/61 717/171 |
| 2004/0076159 A1* | 4/2004 | Utsubo | G06F 3/121 370/392 |
| 2005/0132028 A1* | 6/2005 | Lester | G06K 15/00 709/222 |
| 2005/0198267 A1* | 9/2005 | Parks | H04L 67/16 709/224 |
| 2005/0198493 A1 | 9/2005 | Bartas | |
| 2006/0064327 A1* | 3/2006 | Simon | G06F 17/30578 705/3 |
| 2006/0075079 A1* | 4/2006 | Powers | G06F 9/5072 709/220 |
| 2010/0058319 A1* | 3/2010 | Kawaguchi | G06F 8/63 717/172 |
| 2010/0142377 A1 | 6/2010 | Caciula et al. | |
| 2011/0055358 A1* | 3/2011 | Lee | G06F 9/4416 709/219 |
| 2011/0093516 A1* | 4/2011 | Geng | G06F 8/65 707/827 |
| 2013/0188521 A1* | 7/2013 | Jain | H04L 12/185 370/255 |
| 2016/0191308 A1* | 6/2016 | Berry | H04L 41/0806 709/221 |

* cited by examiner

SYSTEM AND METHOD FOR CONFIGURING NETWORK DEVICES

BACKGROUND

Configuration of network devices such as routers or switches may be a time consuming and manual process. During configuration of a network, it is sometimes not obvious how a network infrastructure component functions within the larger framework of the network. For example, during a network configuration only a portion of the components of the network may be operational during the configuration which may cause ambiguity regarding the function of a to be configured component.

SUMMARY

In general, in one aspect, embodiments of the invention relate to a method of configuring a network device. The method may include obtaining, by a version server, a first configuration action; matching, by the version server, the first configuration action to a first entry of an action database of the version server; and sending, by the version server, a version controlled configuration action of the first entry.

In general, in one aspect, embodiments of the invention may relate to version server. The version server may include an action database stored on a storage of the version server, and a version generator configured to generate a version controlled action based on a configuration update of a network device. In one or more embodiments of the invention, the action database includes entries that specify actions used in a process of configuring a server, and each entry of the action database is associated with a state of the server after the action of the entry is performed.

In general, in one aspect, embodiments of the invention may relate to a non-transitory computer readable medium storing instructions which, when executed by a computing device, cause the computing device to obtain a first configuration action; match the first configuration action to a first entry of an action database; and send a version controlled configuration action of the first entry.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to a method and system for configuring network infrastructure. More specifically, one or more embodiments of the invention may enable network infrastructure components to be identified and configured based on the identification. An unknown network infrastructure component may be identified by pattern matching to a database including identities of components of the network infrastructure. The identified network infrastructure component may then be configured based on the identification.

Additional embodiments of the invention may relate to methods and systems for generating version controlled configuration actions. The version controlled configuration actions may be used to configure network infrastructure.

For example, network infrastructure of a network may be periodically updated, e.g., software updates. The updates may include modifications to an operating system, an operating system extension, or other software or hardware component of the network infrastructure. In response to each modification, a version controlled configuration action may be generated. If a component of the network infrastructure fails, the component may need to be replaced to maintain the operation of the network. Embodiments of the invention may enable a replacement component to be rapidly configured by the version controlled configuration actions.

Figure 1:
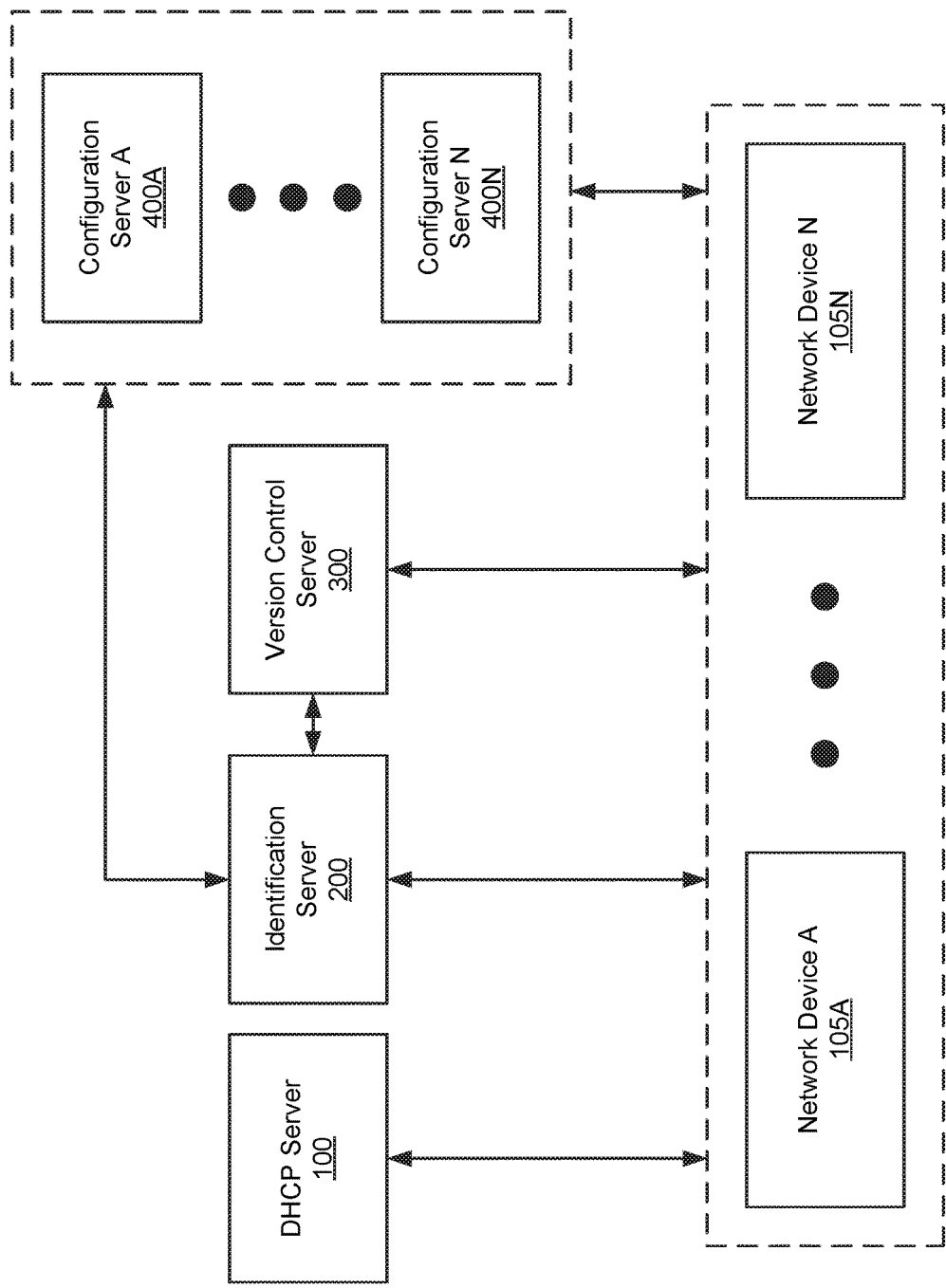
FIG. 1 shows a system in accordance with one or more embodiments of the invention.

FIG. 1 shows a system in accordance with one or more embodiments of the invention. The system shown in FIG. 1 may be used, for example, to configure network devices and generate version controlled configuration actions. The system may include at least one dynamic host configuration protocol (DHCP) server (100), at least one network device (105A-105N), at least one identification server (200), at least one version control server (300), and at least one configuration server (400A-400N). Each of the components is described below.

In one or more embodiments of the invention, the DHCP server (100) is configured to implement the dynamic host configuration protocol. The DHCP server (100) may be an application that is configured to receive DHCP requests from DHCP clients, such as the network devices (105A-105N), and provide the requested IP address(es). The DHCP server (100) may be implemented on a physical server or in a virtual machine (or other virtualized environment) executing on a physical server. The DHCP server (100) may be operatively connected using any type of connection to network devices (105A-105N). In one or more embodiments of the invention, the connection may be a wired connection and/or wireless connection. In one or more embodiments of the invention, the connection may be through one or more networks and/or network devices.

In one or more embodiments of the invention, the network devices (105A-105N) may be switches, routers, multilayer routers, and/or other network communications devices. The network devices (105A-105N) may be configured to transmit packets (e.g., via routing and/or forwarding) through a network. For example, the network devices (105A-105N) be configured to receive incoming packets and forward the packets to another network device to facilitate the transmission of the incoming packets to a destination device.

The network devices (105A-105N) may be physical devices that include non-transitory storage, memory (e.g. Random Access Memory), one or more processors, and ports. The non-transitory storage may include instructions, which when executed by the one or more processors enable the network devices (105A-105N) to perform the functions described in this application and shown in FIGS. 5, 6, 7, 8, 11, and 12.

The network devices (105A-105N) may be operatively connected using any type of connection to the DHCP Server (100), identification server (200), version control server (300), and configuration servers (400A-400N). In one or more embodiments of the invention, the connection may be a wired connection and/or wireless connection. In one or more embodiments of the invention, the connection may be through one or more networks and/or network devices.

In addition to the above functionality, the network devices (105A-105N) may be configured to operate as a DHCP client and request IP address information from the DHCP Server (100). Further, each network device (105A-105N) may be configured to execute other protocols such as link layer discovery protocol (LLDP), and execute configuration scripts (e.g., configuration scripts written in YAML Ain't Markup Language (YAML) or in any other appropriate programming and/or scripting language).

In one or more embodiments of the invention, the identification server (200) is an application that is configured to determine the identity of a network device (105A-105N) and provide one or more identification files based on the aforementioned identification. The identification server (200) may be implemented on a physical server or in a virtual machine (or other virtualized environment) executing on a physical server. The physical server may include a non-transitory storage, memory (e.g. Random Access Memory), one or more processors, and at least one network interface. The non-transitory storage may include instructions, which when executed by the one or more processors enable the identification server (200) to perform the functions described in this application and shown in FIGS. 10-12.

The identification server (200) may be operatively connected using any type of connection to the network device (105A-105N) and version control server (300). In one or more embodiments of the invention, the connection may be a wired connection and/or wireless connection. In one or more embodiments of the invention, the connection may be through one or more networks and/or network devices. Additional information regarding the identification server (200) is shown in FIGS. 2A-2D.

In one or more embodiments of the invention, the version control server (300) is configured to generate and/or store configuration actions and/or configuration action sets based on the configurations of the network devices (105A-105N) as the configurations change over time. Each configuration action and/or configuration action set may be stored as one or more entries in a database.

The version control server (300) may be implemented on a physical server or on a virtual machine (or other virtualized environment) executing on a physical server. The physical server may include a non-transitory storage, memory (e.g. Random Access Memory), one or more processors, and at least one network interfaces. The non-transitory storage may include instructions, which when executed by the one or more processors enable the version control server (300) to perform the functions described in this application and shown in FIGS. 9 and 11-12.

Figure 3A:
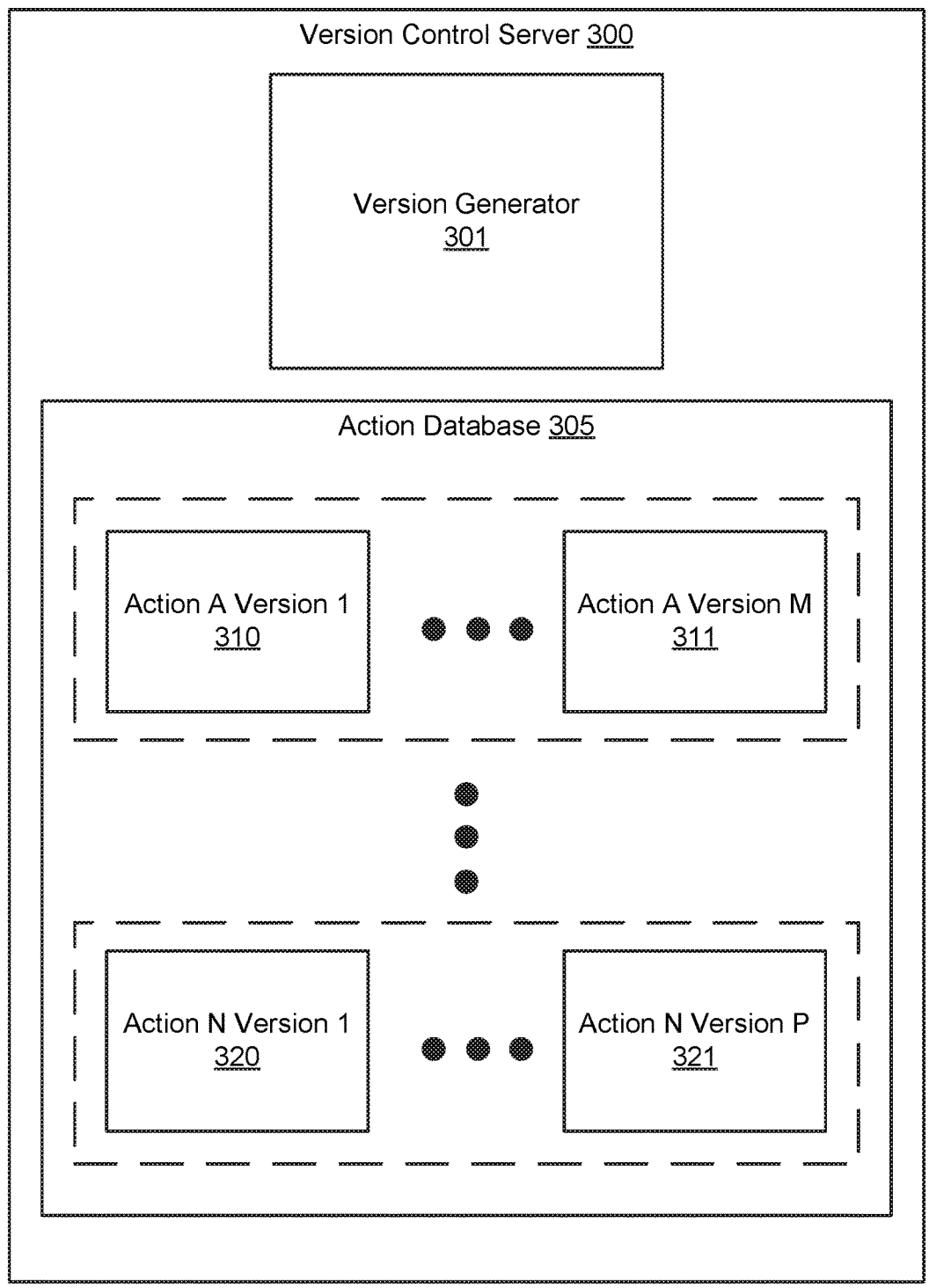
FIG. 3A shows a version control server in accordance with one or more embodiments of the invention.
Figure 3B:
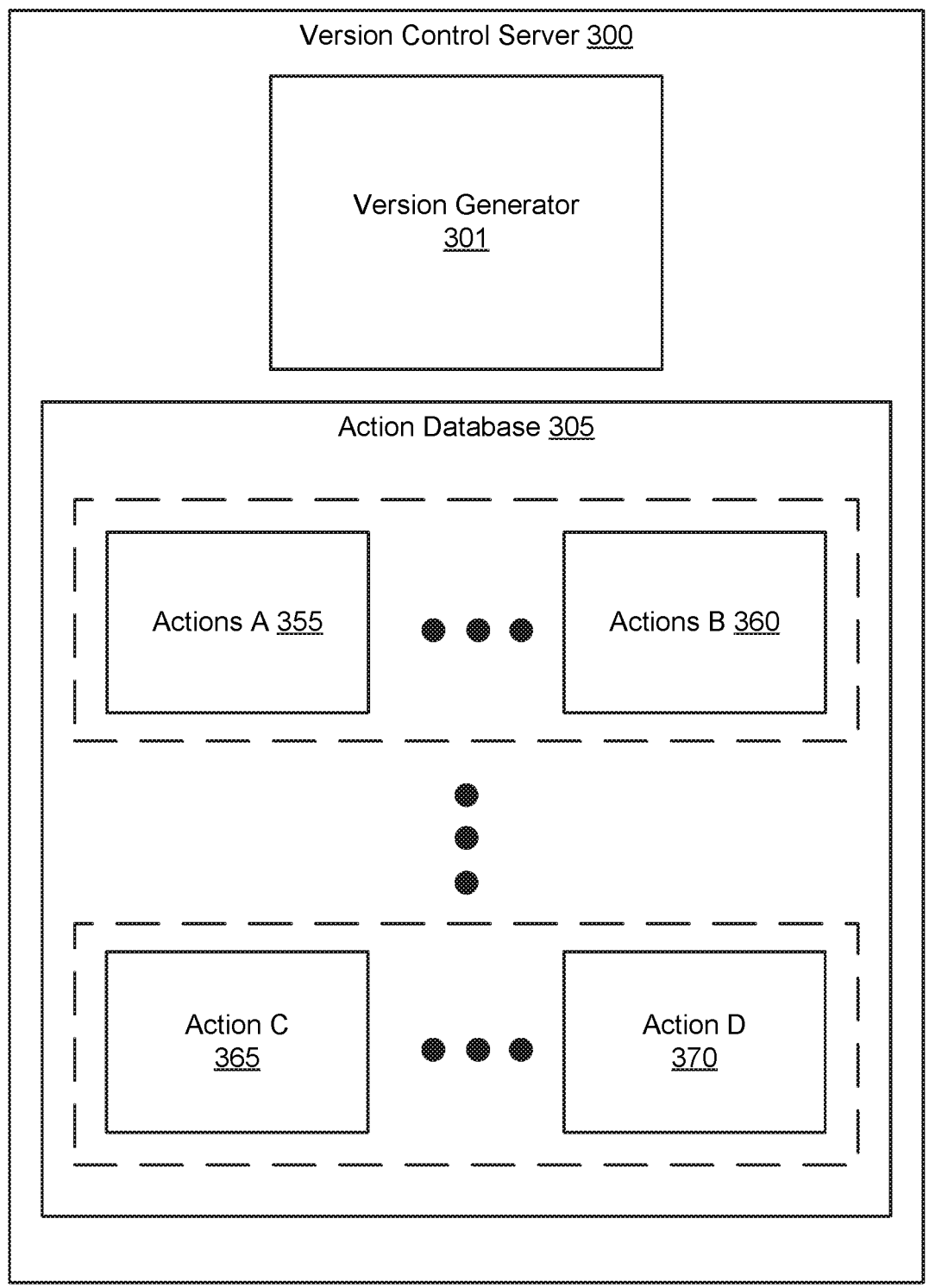
FIG. 3B shows a version control server in accordance with one or more embodiments of the invention.

The version control server (300) may be operatively connected using any type of connection to the network device (105A-105N) and identification server (200). In one or more embodiments of the invention, the connection may be a wired connection and/or wireless connection. In one or more embodiments of the invention, the connection may be through one or more networks and/or network devices. Additional information regarding the version control server (300) is shown in FIGS. 3A-3B.

In one or more embodiments of the invention, the configuration servers (400A-400N) are configured to store data files that may be used to configure a network device (105A-105N). The configuration servers (400A-400N) may be implemented on a physical server or on a virtual machine (or other virtualized environment) executing on a physical server. The physical server may include a non-transitory storage, memory (e.g. Random Access Memory), one or more processors, and at least one network interface. The non-transitory storage may include instructions, which when executed by the one or more processors enable the configuration server (400) to perform the functions described in this application.

Figure 4:
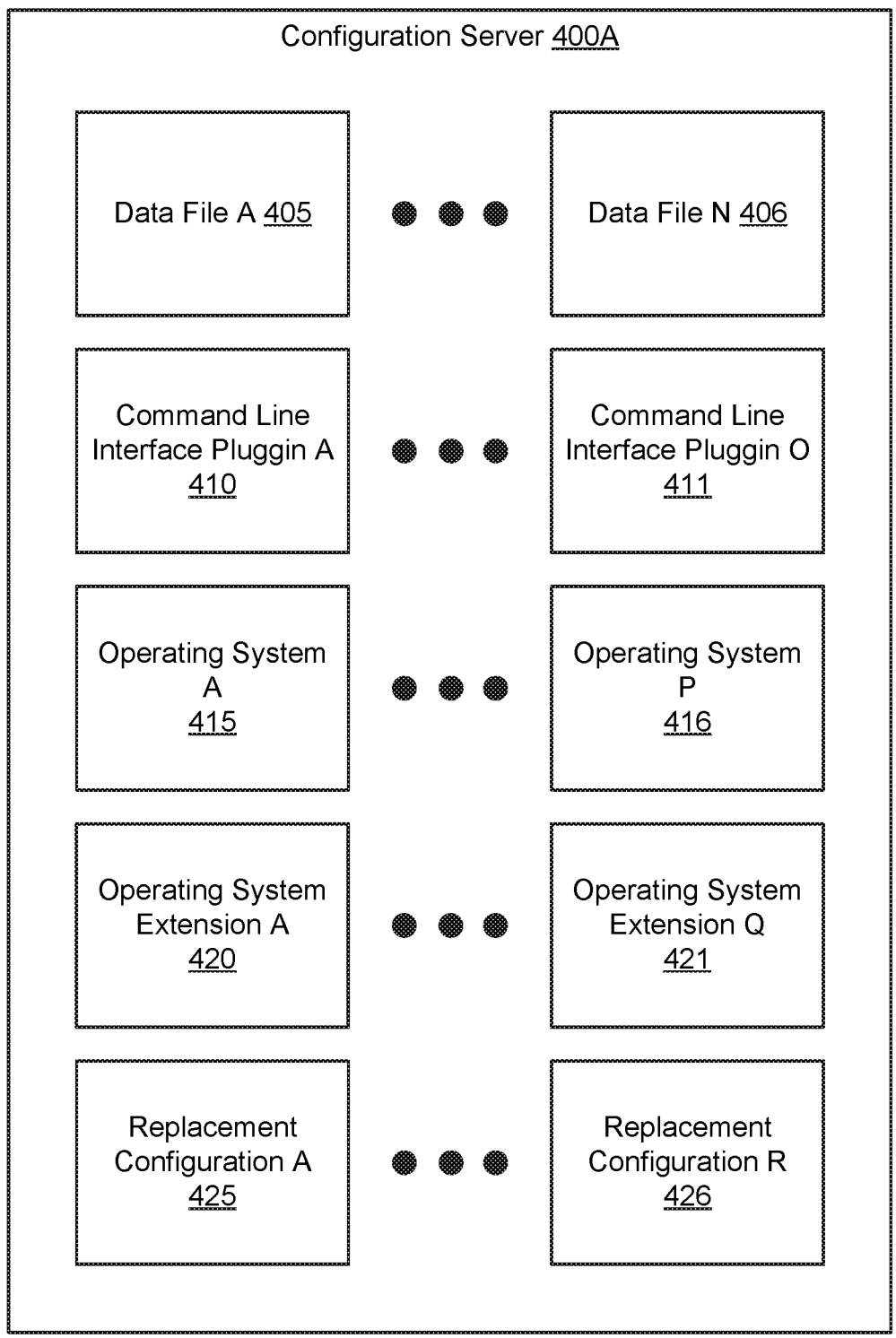
FIG. 4 shows a configuration server in accordance with one or more embodiments of the invention.

The configuration servers (400A-400N) may be operatively connected using any type of connection to the network device (105A-105N) and identification server (200). In one or more embodiments of the invention, the connection may be a wired connection and/or wireless connection. In one or more embodiments of the invention, the connection may be through one or more networks and/or network devices. Additional information regarding the configuration servers (400A-400N) is shown in FIG. 4.

Figure 2A:
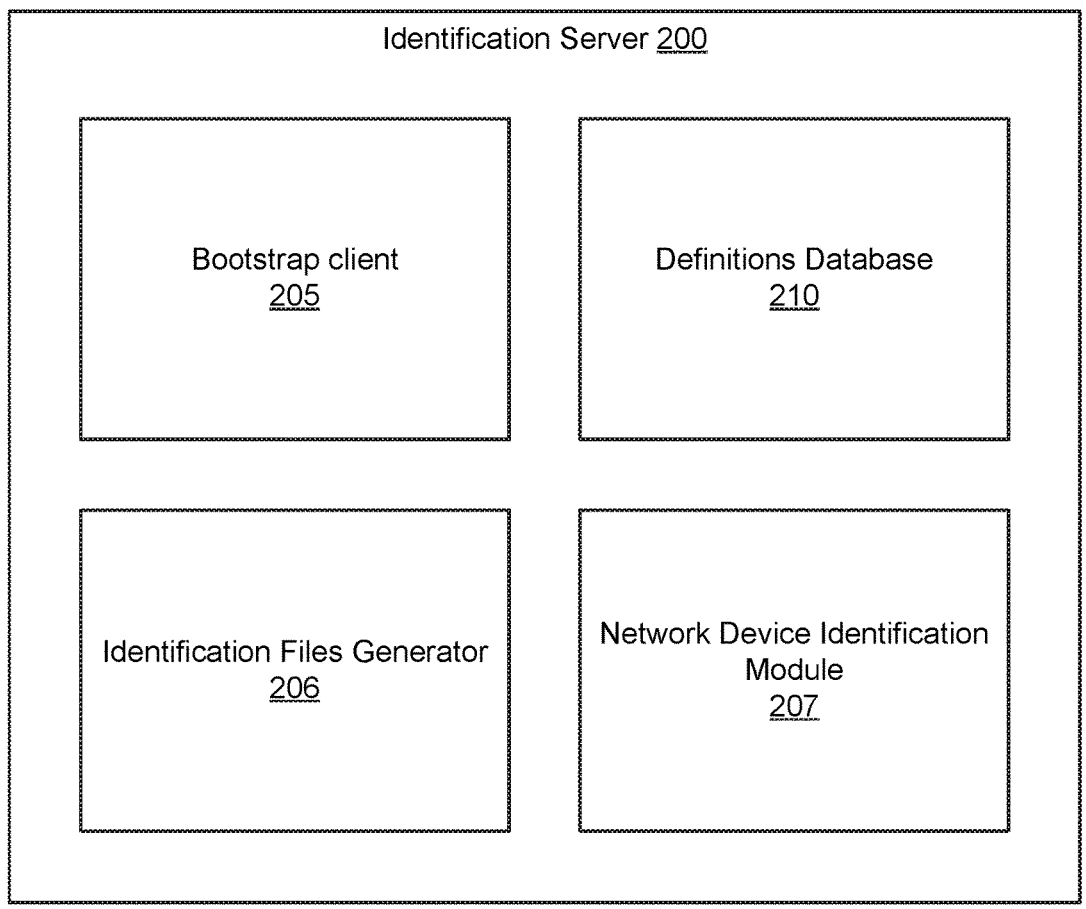
FIG. 2A shows an identification server in accordance with one or more embodiments of the invention.

Returning to the identification server (200), FIG. 2A shows a diagram of identification server (200) in accordance with one or more embodiments of the invention. As discussed above, the identification server (200) includes functionality to implement the methods shown in FIGS. 5, 6, 7, 8, 11, and 12. In order to perform the methods shown in FIGS. 5, 6, 7, 8, 11, and 12, the configuration server (200) may include a bootstrap client (205). The bootstrap client (205) may be a program that includes instructions, when executed by one of the network devices (105A-105N), cause the network device (105A-105N) to collect, aggregate, and send identification information of the network device to the identification server (200) as shown, for example, in FIG. 6. Additionally, the bootstrap client (205) may be configured to perform configuration actions received from the identification server as shown, for example, in FIG. 7.

The identification server (200) may also include (or be operatively connected to) a definitions database (210) and include functionality to read, create, and/or modify entries in the definitions database (210). The definitions database (210) may include information that enables the identification server (200) to identify a network device (105A-105N) based on identification information received from the network device (105A-105N).

The entries in the definitions database (210) may include conditions and configuration actions associated with the conditions. The identification server (200) may perform pattern matching of information received from the network device (105A-105N) to information included in the definitions database (210) to determine an identity of the network device (105A-105N). More specifically, the identification server (200) may pattern match information received from the network device (105A-105N) to a condition in an entry in the definitions database to determine an identity of the network device (105A-105N). Pattern matching is further described by way of examples in later sections of this application.

The definitions database (210) may also include information that enables the identification server (200) to generate identification files corresponding to the network device (105A-105N). More specifically, each entry of the definitions database may include configuration actions associated with a condition. When performing pattern matching to identify a network device (105A-105N), the identification server may determine that information received from the network device (105A-105N) may match a condition in an entry in the definitions database. The identification server (200) may determine, based on the match, the configuration actions associated with the condition. The identification server (200) may generate identification files based on the configuration actions associated with the condition.

The identification files may enable the network device (105A-105N) to be configured. The identification files may be, for example, YAML files that include instructions. These instructions may cause, for example, the network device (105A-105N) to install an operating system, an operating system extension, send notifications to a user such as a network administrator, or perform other actions that may configure the network device (105A-105N).

Figure 2B:
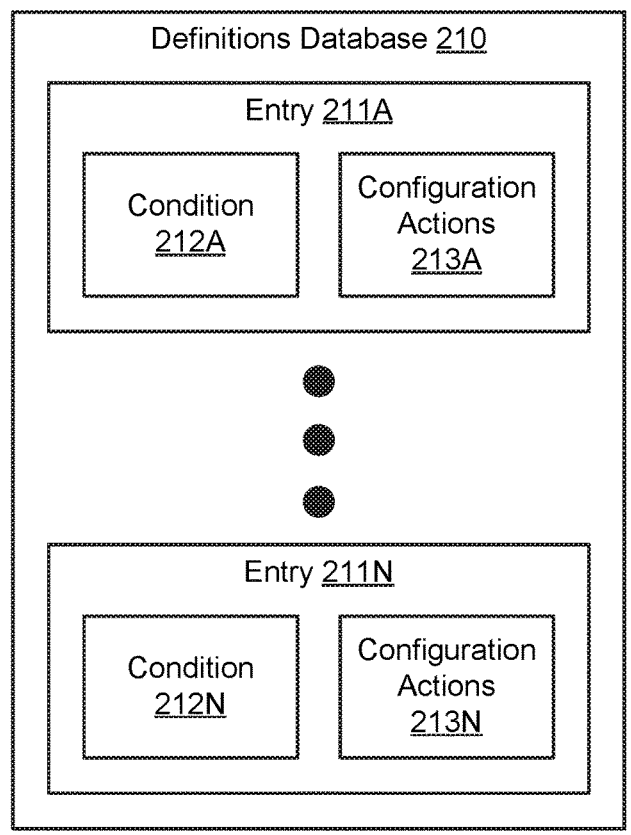
FIG. 2B shows a definitions database in accordance with one or more embodiments of the invention.
Figure 2C:
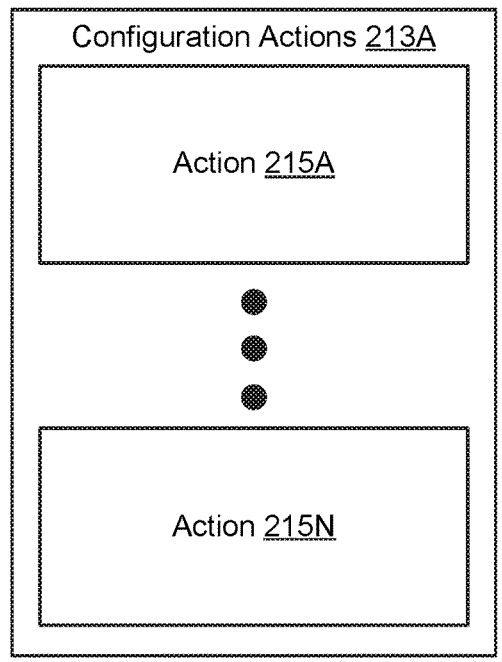
FIG. 2C shows configuration actions in accordance with one or more embodiments of the invention.

In an embodiment of the invention, each entry (211A-211N) in the definitions database (210) may include a condition (212A-212N) and configuration actions (213A-213N) associated with the condition (212A-212N) as shown in FIG. 2B. Each entry (211A-211N) may also include additional fields such as descriptors or variables. The condition (212A-212N) may be used by the identification server (200) to pattern match a network device (105A-105N).

The condition (212A-212N) may be identification information of a network device (105A-105N). The identification information may be the model number, port count, connectivity information, and/or any other information to identify the network device (105A-105N).

Each configuration action (215A-215N) may be an instruction(s) to be carried out by the network device (105A-105N). As will be discussed in greater detail below, multiple versions of an instruction may be stored on a version control server (300) and each configuration action (215A-215N) may serve as a pointer (or reference) to a version of the instruction. Each instruction may be a YAML instruction located on the version control server (300). The identification server (200) may be configured to retrieve a version of the YAML instruction to which the configuration action (215A-215N) points.

Figure 2D:
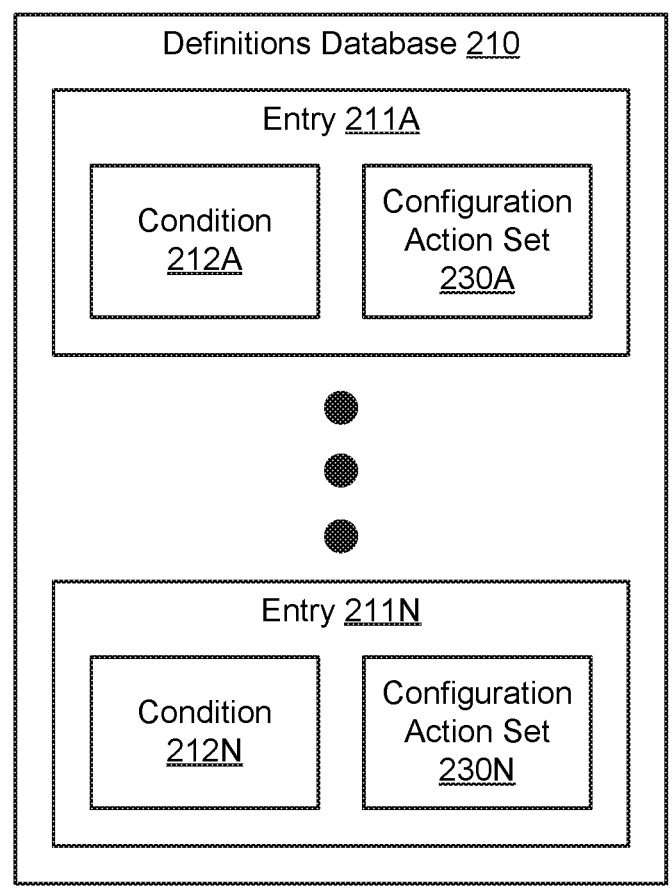
FIG. 2D shows a definitions database in accordance with one or more embodiments of the invention.

In another embodiment of the invention, each entry (211A-211N) in the definitions database (210) may include a condition (212A-212N) and a configuration action set (230A-230N) associated with the condition (212A-212N) as shown in FIG. 2D. The condition (212A-212N) may be identification information of a network device (105A-105N) as described above with respect to FIG. 2C.

The configuration action set (230A-230N) may serve as a pointer (or as a reference) to a group of version controlled instructions located on the version control server (300). The group of instructions may be multiple YAML instructions located on the version control server (300). The identification server (200) may be configured to retrieve a version of the multiple YAML instructions to which the configuration action (215A-215N) refers.

In one or more embodiments of the invention, the identification server (200) may include a network device identifier (207). The network device identifier (207) may be a program running on the identification server (200). The network device identifier (207) may identify a network device (105A-105N) based on identification information received from the network device (105A-105N). The network device identifier (207) may identify the network device (105A-105N) by pattern matching the received identification information to the conditions (212A-212N) included in the entries (211A-211N) of the definitions database (210).

The process of pattern matching by the network device identifier (207) is further described using four explanatory examples. The following examples are for explanatory purposes and are not intended to limit the scope of the technology.

EXAMPLE 1

The following is a first example of an entry in a definitions database (210):
Name: standard leaf definition
Definition: leaf_template
Node: ABC12345678
Interfaces:
    Ethernet49: pod1-spine1:Ethernet1/1
    Ethernet50:
Device: pod1-spine2
Port: Ethernet1/1

In the above example, the fields Interfaces and Node represent conditions and the field Definition represents configuration actions. During pattern matching, the network device identifier (207) may compare identification information of a network device to the conditions. In this example, the Node field specifies a system identification and the interface field specifies two pieces of connectivity information to which the network device identifier (207) may compare the identification information. More specifically, the identification information received from the network device must include a system identification of "ABC12345678", interface Ethernet49 connected to node pod1-spine1 on port Ethernet1/1, and interface Ethernet50 connected to node pod1-spine2 on port Ethernet1/1.

If the identification information received from a network device matches the system identification and connectivity information, the network device identifier (207) may determine the network device as a match for the entry of the first example. When the network device identifier (207) determines a network device as matching the first example entry, the network device identifier (207) may notify the identification files generator (206) of the match by sending the configuration actions. The operation of the identification files generator (206) is discussed in greater detail below.

EXAMPLE 2

The following is a second example of an entry in a definitions database (210):
Name: standard leaf definition
Definition: leaf_template
Node: 001c73aabbcc
Interfaces:
   Any: regex('pod\d+-spine\d+'):Ethernet1/$
   Any:
     Device: regex('pod\d+-spine1')
     Port: Ethernet2/3

In the second example, the fields Interfaces and Node represent conditions and the field Definition represent configuration actions. To match to the second example, the identification information received from the network device must include a system identification of "001c73aabbcc", at least one interface connected to a node that matches the regular expression "pod\d+-spine\d+" on any port of module 1, and at least one interface connected to a node that matches the regular expression "pod+-spine1" on port Ethernet2/3.

EXAMPLE 3

The following is a third example of an entry in a definitions database (210):
Name: standard leaf definition
Definition: do-1/pod-1/leaf_template
Variables:
   Not_spine: excludes('spine')
   Any_spine: regex('spine\d+')
   Any_pod: includes('pod')
   Any_pod_spine: any_spine and any_pod
Interfaces:
   Ethernet1: $any_spine:Ethernet1/$
   Ethernet2: $pod1-spine2:any
   Any: excludes('spine1'):Ethernet49
   Any: excludes('spine2'):Ethernet49
   Ethernet49:
     device: $not_spine
     port: Ethernet49
   Ethernet50
     device: excludes('spine')
     port: Ethernet50

In the third example, the field Interfaces represent conditions and the field Definition represent configuration actions. Unlike the first and second examples, the third example does not include a Name field as a condition and thus only connectivity information is used during pattern matching. Additionally, the third example includes a variables field. The variables field includes neither conditions nor configuration actions. The variables field includes logical expressions that may be used in a conditions field for pattern matching.

The Variables field in example 3 includes four example expressions. The first, "Not_spine: excludes('spine')", example expression evaluates as a match if the identification information received from a network devices indicates the network device is not a spine. The second, "Any_spine: regex('spine\d+')", example expression evaluates as true if the identification information received from a network device indicates the network device is a spine+ of a network. The third, "Any_pod: includes('pod')", example expression evaluates as a match if the identification information received from a network device indicates it is a member of a pod of a network. The fourth, "Any_pod_spine: any_spine and any_pod", is a combination of the second and third example expressions and evaluates as a match if the identification information received from a network device matches the second and third example expressions.

To match to the third example, the identification information received from the network device must include a first interface Ethernet1 connected to a node that evaluates as a match to the second example expression on Ethernet1/$, a second interface Ethernet2 connected to node "$pod1-spine2" on any Ethernet port, a third interface connected to a node that is not spine1 of a network on Ethernet49, a fourth interface connected to a node that is not spine2 of a network on Ethernet49, a fifth interface connected to a node that evaluates as a match for the second example expression on Ethernet49, and a sixth interface connected to a node that is not a spine of a network on Ethernet 50.

EXAMPLE 4

The following is a fourth example of an entry in a definitions database (210):
Name: sample mlag definition
Definition: mlag_leaf_templat
Variables:
   any_spine: includes('spine')
   not_spine: excludes('spine')
Interfaces:
   Ethernet1: $any_spine:Ethernet1/$
   Ethernet2: $any_spine:any
   Ethernet3: none
   Ethernet4: any
   Ethernet5:
     device: includes('oob')
     port: any
   Ethernet49: $not_spine: Ethernet49
   Ethernet50: $not_spine:Ethernet50

In the fourth example, the field Interfaces represent conditions and the field Definition represent configuration actions. Like the third example, the fourth example does not include a Name field as a condition and thus only connectivity information is used during pattern matching.

The Variables field in the fourth example includes two example expressions. The first, "any_spine: includes('spine')", example expression evaluates as a match if the identification information received from a network devices indicates the network device is a spine. The second, "not_spine: excludes('spine')", example expression evaluates as a match if the identification information received from a network devices indicates the network device is not a spine.

To match to the fourth example, the identification information received from the network device must include a first interface Ethernet1 connected to a node that evaluates as a match to the first example expression on Ethernet1/$, a second interface Ethernet2 connected to a node that evaluates as a match to the first example expression on any port, a third interface Ethernet3 that is not connected to a node; a fourth interface Ethernet4 that is connected to any node, a fifth interface Ethernet5 connected to a node that "oob" via any port, and a sixth interface Ethernet49 connected to a node that evaluates as a match for the second example expression on Ethernet49, and a sixth interface Ethernet50 connected to a node that evaluates as a match for the second example expression on Ethernet50.

Thus, as illustrated by the four examples provided above, pattern matching may match based on network device connectivity information, network device system identification information, and may include the use of logical expression.

The network device identifier (207) may be configured to mark an entry in the definitions database as unavailable when identity information associated with a network device is matched to the entry in the definitions database (200). In other words, when a match is made between a network device and an entry in a definitions database the entry may be removed from consideration during pattern matching.

If an entry (211A-211N) is marked as unavailable, the network device identifier (207) will not consider the entry when performing pattern matching. In one or more embodiments of the invention, if the network device identifier (207) performs pattern matching and is unable to match the identification information to an entry (211A-211N), the network device identifier (207) may be configured to identify the network device (105A-105N) as unknown and notify a user, e.g., network administrator.

For example, the definitions database may include a first entry having a condition of a first interface Ethernet1 connected to a node by Ethernet1/1 and a second entry having a condition of a first interface Ethernet1. A first network device may send identification information of an interface Ethernet1 connected to a node by Ethernet1/1 to the identification server. The network device identifier (207) may perform pattern matching and determine that the network device information of the first network device matches the first entry. The network device identifier (207) may mark the first entry as unavailable in response to matching the first network device to the first entry. A second network device may send identification information of an interface Ethernet1 connected to a node by Ethernet1/1 to the identification server. The network device identifier (207) may perform pattern matching to determine the identity of the second network device. During pattern matching, the network device identifier (207) would not consider the first entry because the first entry is marked as unavailable. The network device identifier (207) may determine that the network device information of the second network device matches the second entry. The network device identifier (207) may mark the second entry as unavailable in response to matching the second network device to the second entry. A third network device may send identification information of an interface Ethernet2 connected to a node by Ethernet1/2 to the identification server. The network device identifier (207) may perform pattern matching and not find an entry that matches the identification information. The network device identifier (207) may identify the third network device as unknown and send a message via email, text, or other medium to a user indicating the third network device is unknown.

In one or more embodiments of the invention, the network device identifier (207) may be configured to mark an entry in the definitions database as unavailable when a specified number of network devices are matched to the entry. Each entry of the definitions database may have an associated number of matches to be made before the entry is marked as unavailable. In other words, a specified number of network devices may be matched to an entry of the definitions database before the entry is marked as unavailable and each entry may specific the number of matches.

For example, a definitions database may include an entry having a condition of a first interface Ethernet1 connected to a node by Ethernet1/1 and specifying a number of matches as 2. A first network device may send identification information of an interface Ethernet1 connected to a node by Ethernet1/1 to the identification server. The network device identifier (207) may perform pattern matching and determine that the network device information of the first network device matches the first entry. The network device identifier (207) may mark the entry as having been matched to 1 network device. The network device identifier (207) may compare the number of times the entry has been matched to the number of matches specified by the entry. The network device identifier (207) may determine that the entry is still available because the number of times the entry has been matched is less than the number of matches specified by the entry.

A second network device may send identification information of an interface Ethernet1 connected to a node by Ethernet1/1 to the identification server. The network device identifier (207) may perform pattern matching and determine that the network device information of the second network device matches the first entry. The network device identifier (207) may mark the entry as having been matched to 2 network device. The network device identifier (207) may compare the number of times the entry has been matched to the number of matches specified by the entry. The network device identifier (207) may determine that the entry is no longer available because the number of times the entry has been matched is equal to or greater than the number of matches specified by the entry. The network device identifier (207) may mark the entry as unavailable in response to determining the entry is no longer available.

In one or more embodiments of the invention, the identification server (200) may include an identification files generator (206). The identification files generator (206) may be a program that generates a YAML file when the network device identifier (207) determines an identity of a network device (105A-105N). The identification files generator (206) may be configured to retrieve one or more YAML files including instructions from the version control server (300) based on the configuration actions (213A-213N) or configuration action sets (230A-230N) in the entry (211A-211N) corresponding to the condition (212A-212N) to which the identification information associated with the network device (105A-105N) matched. In one or more embodiments of the invention, the identification files generator (206) may generate an identification file(s) by aggregating the retrieved YAML files including instructions and/or modify variable placeholders contained in the YAML files retrieved from the version control server (300).

As discussed above, the identification server may identify a network device and retrieve configuration actions from the version control server (300). FIGS. 3A and 3B show two embodiments of a version control server (300) in accordance with one or more embodiments of the invention. In the first embodiment shown in FIG. 3A, individual configuration actions are version controlled and stored in an actions database. In the second embodiment shown in FIG. 3B, sets of configuration actions are version controlled and stored in the actions database.

In both embodiments, the version control server (300) may include a version generator (301) and an action database (305). The version generator (301) may be a program that may generate an entry in the action database (305) based on a change in a configuration of a network device (105A-105N). The entry may include one or more YAML files including instruction(s) reflecting the change in the configuration of the network device (105A-105N). Additionally, in both embodiments, the action database (305) may be a database including entries (310, 311, 320, 321) that include one or more YAML files including instruction(s).

The instructions included in the YAML files may cause the network device to perform one or more actions. The actions may be configurable, by the identification server. For example, the instructions may include variable or placeholders that may be set by the identification server. The identification server may set the variables or placeholders based on an identity of a network device.

In the first embodiment, shown in FIG. 3A, version control may be performed on a per configuration change type basis. A first set of entries (310, 311) may include YAML files including instructions that reflect a first type of configuration change to a network device (105A-105N). In one or more embodiments of the invention, the type may be an operating system, a version of an operating system, an operating system extension, a operating system plugin, a configuration file, or a script configured to send an email to a recipient.

For example, when a network device (105A-105N) is initially powered on, it may run a first version of an operating system. At a later date, a user may update the operating system to a newer version. In that case, one entry of the first set of entries (310, 311) may include a YAML file including instruction(s) that, when run by a network device (105A-105N), cause the network device (105A-105N) to install the first version of the operating system. Additionally, a second entry of the first set of entries (310, 311) may include a YAML files including instruction(s) that, when run by the network device (105A-105N), cause the network device (105A-105N) to install the second version of the operating system.

In a second embodiment, shown in FIG. 3B, version control may be performed on a per network device configuration change basis. A first set of entries (355, 360) may include one or more YAML files including instruction(s) that reflect changes to at least one type of configuration of a first network device (105A-105N) and a second set of entries (365, 370) that reflect changes to at least one type of configuration of a second network device (105A-105N). In one or more embodiments of the invention, the type may be an operating system, a version of an operating system, an operating system extension, a operating system plugin, a configuration file, or a script configured to send an email to a recipient.

For example, when a network device (105A-105N) is initially powered on, it may run a first version of an operating system and a first operating system extension. At a later date, a user may remove the first operating system extension and install a second operating system extension. In that case, one entry of the first set of entries (310, 311) may include YAML instructions that, when run by a network device (105A-105N), cause the network device (105A-105N) to install the first version of the operating system and the first operating system extension. Additionally, a second entry of the first set of entries (310, 311) may include YAML instructions that, when run by the network device (105A-105N), causes the network device (105A-105N) to install the first version of the operating system and the second operating system extension.

Thus, in the first embodiment, each action may be version controlled and in the second embodiment the configuration changes to a network device are version controlled. However, embodiments of the invention are not limited to the first embodiment or the second embodiments. An action database (305) according to one or more embodiments of the invention may include entries according to the first embodiment and second embodiment.

As described above, the identification server (200) and version control server (300) may be used to generate identification files that may configure a network device. During the configuration process of the network device, the network device may need to retrieve data files that are not present on the network device. One or more configuration servers may store the data files that the network device may need to access during configuration. The data files may take the form of computer readable instructions, software repositories, software extensions, or other data file types that may be used to configure a network device.

FIG. 4 shows a configuration servers (400A-400N) in accordance with one or more embodiments of the invention. In order to perform the methods shown in FIGS. 9 and 11, the configuration servers (400A-400N) may include data files (405-406), command line interface plugins (410-411), operating systems (415-416), operating system extensions (420-421), and/or replacement configurations (425A-425B) stored on a non-transitory storage. The configuration servers (400A-400N) may be configured to provide the stored files when requested by a network device. The following section describes various files that may be stored in the configuration server.

A data file (405-406) may be a library, text file, audio/visual file, or other file type that may be used by the network device during configuration or after configuration. A command line interface plugin (410-411) may be a program, library, or extension that provide a command line interface with additional functionality, e.g., additional commands. An operating system (415-416) may be software that manages the hardware and software resources of a computer and/or provides common services for software running on the computer. An operating system extension (420-421) may be software that provides an operating system with additional functionality beyond an initial software installation, e.g., additional functionality that is not always present during initial software installation. A replacement configuration (425A-426B) may be a configuration that replaces an existing configuration, e.g., one or more configuration actions that changes the operation of a network device.

Figure 5:
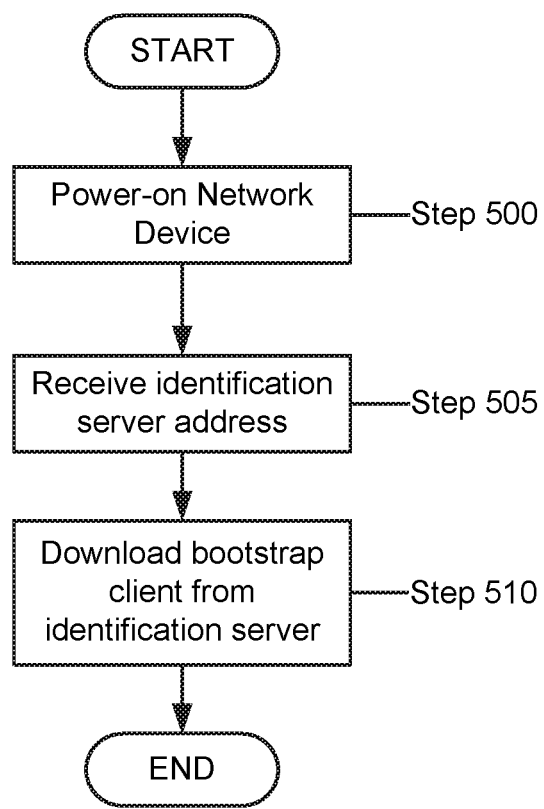
FIG. 5 shows a flowchart of a method of configuring a network device in accordance with one or more embodiments of the invention.
Figure 6:
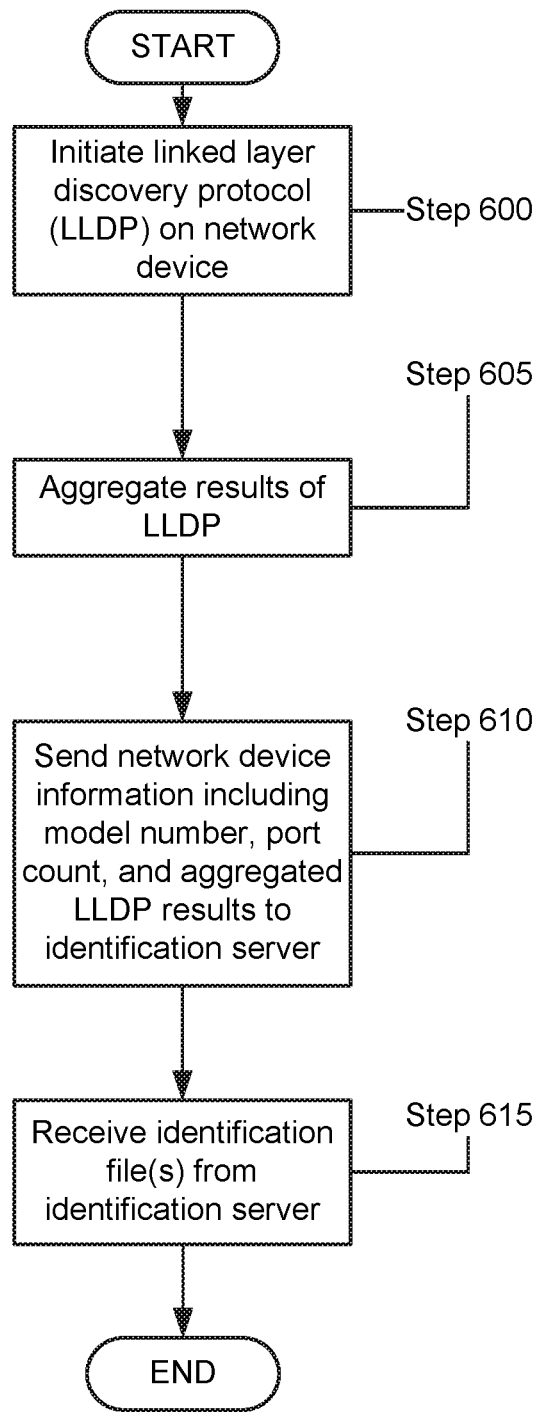
FIG. 6 shows a flowchart of a method of configuring a network device in accordance with one or more embodiments of the invention.
Figure 7:
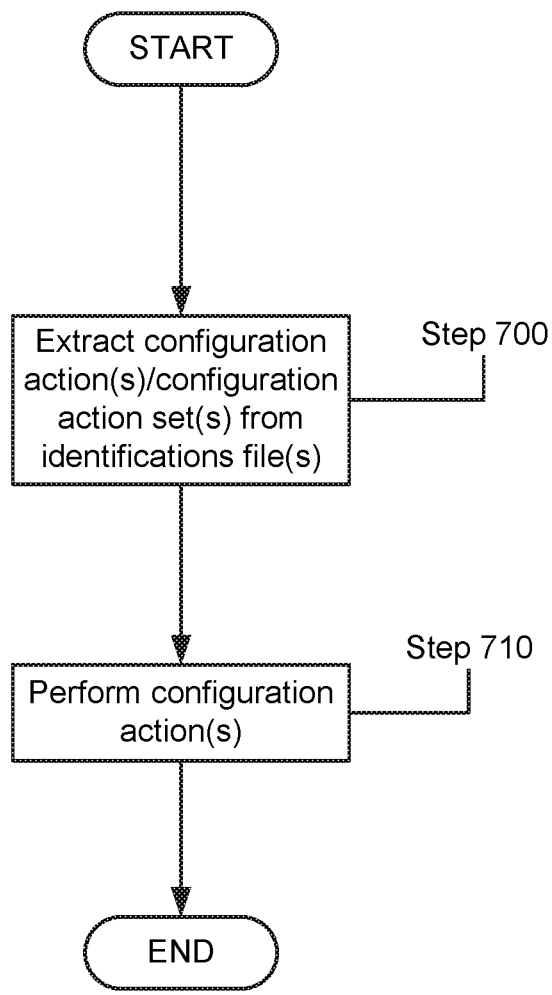
FIG. 7 shows a flowchart of a method of configuring a network device in accordance with one or more embodiments of the invention.
Figure 8:
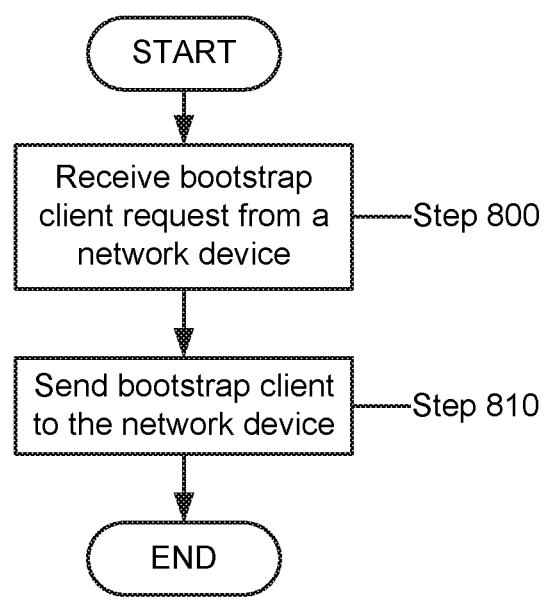
FIG. 8 shows a flowchart of a method of configuring a network device in accordance with one or more embodiments of the invention.
Figure 9:
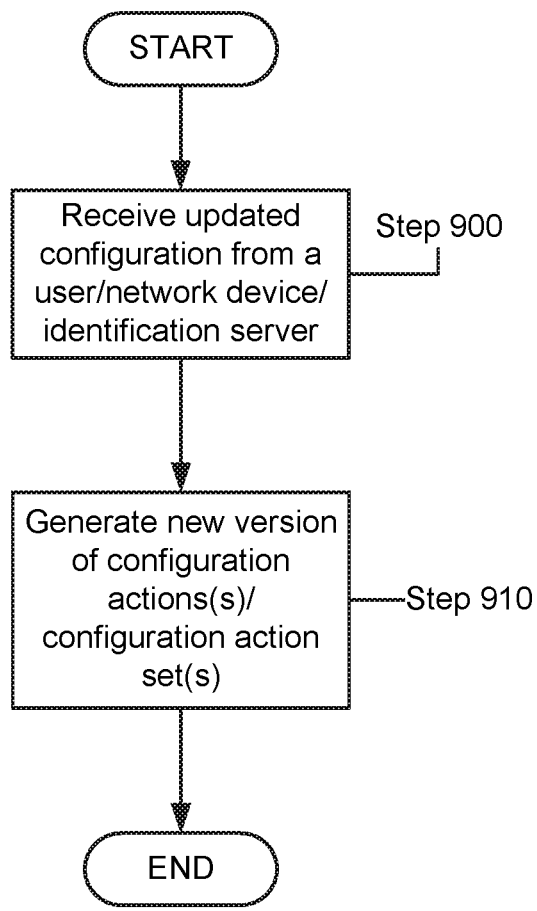
FIG. 9 shows a flowchart of a method of configuring a network device in accordance with one or more embodiments of the invention.
Figure 10:
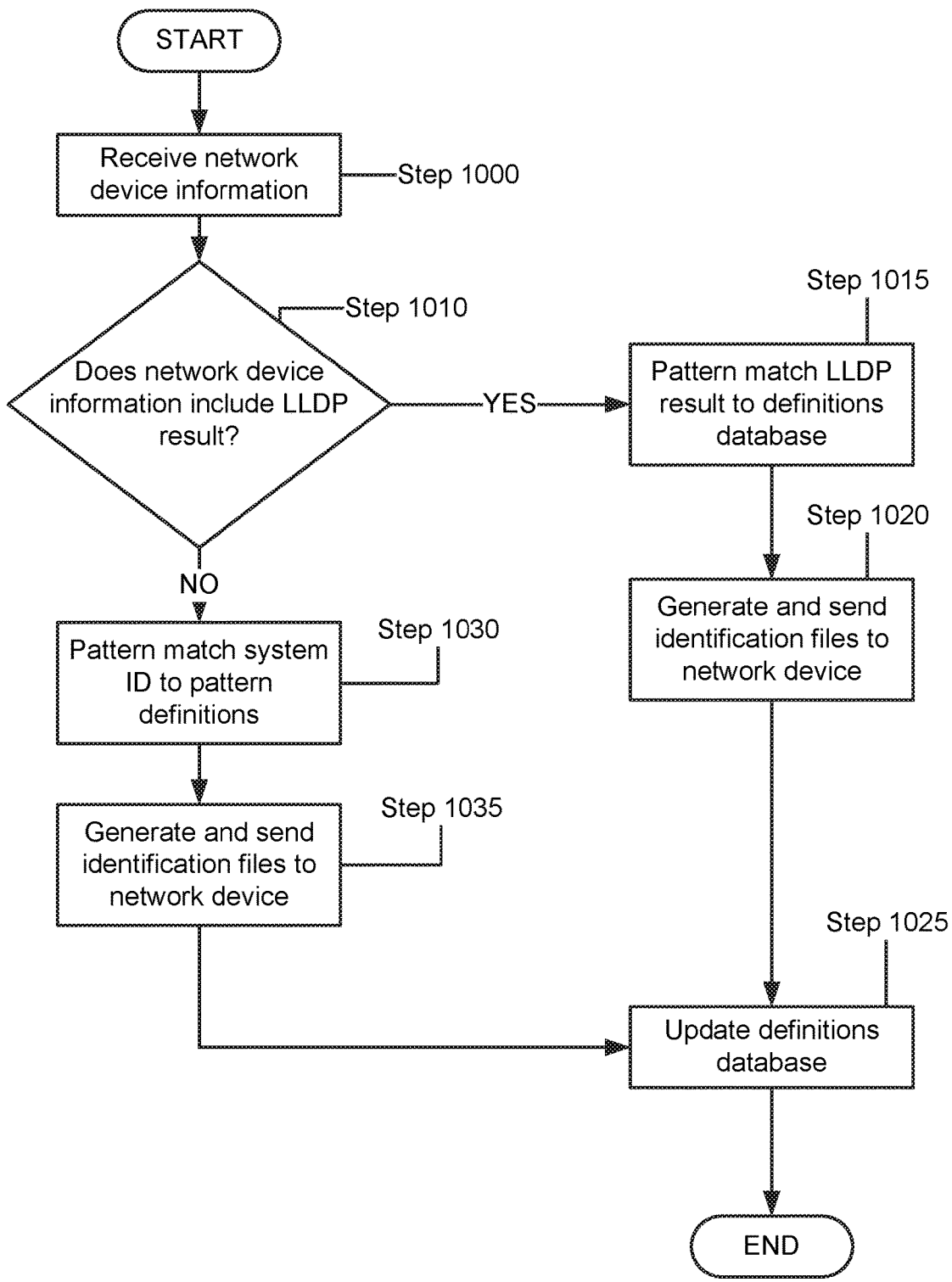
FIG. 10 shows a flowchart of a method of configuring a network device in accordance with one or more embodiments of the invention.

In the following flowcharts and action diagrams, functionality of components of the system shown in FIGS. 1-4 will be described. The functionality shown in the following figures may enable, for example, network devices to be configured and version controlled configuration actions to be generated. FIGS. 5-7 show flowcharts of methods that may be performed, for example, by a network device. FIGS. 8-9 show flowcharts of methods that may be performed, for example, by an identification server. FIG. 10 shows a flowchart of a method that may be performed, for example, by a version control server.

FIG. 5 shows a flowchart according to one or more embodiments of the invention. The method depicted in FIG. 5 may be used to configure a network device in accordance with one or more embodiments of the invention. One or more steps shown in FIG. 5 may be omitted, repeated, and/or performed in a different order among different embodiments.

In Step 500, a network device is powered-on. As part of the power-on process, the network device generates and issues a DHCP request to a DHCP server, e.g., DHCP server (100) in FIG. 1.

In Step 505, the network device receives a response from the DHCP server that includes at least one Internet Protocol (IP) address corresponding to an identification server, e.g., identification server (200) in FIG. 1.

In Step 510, the network device connects to a version control server by the received IP address and downloads a bootstrap client from the identification server. In one or more embodiments of the invention, the network device runs the bootstrap client.

FIG. 6 shows a flowchart according to one or more embodiments of the invention. The method depicted in FIG. 6 may be used to configure a network device in accordance with one or more embodiments of the invention. One or more steps shown in FIG. 6 may be omitted, repeated, and/or performed in a different order among different embodiments.

In Step 600, a network device, running the bootstrap client, initiates the linked layer discovery protocol (LLDP). The LLDP determines the connectivity information of each port of the network device, e.g., to what network infrastructure component the port provides an operative connection.

In Step 605, the network device aggregates the results of the LLDP, e.g., the connectivity information of a network device to other devices.

In Step 610, the network device sends a message to an identification server including identification information of the network device. In one or more embodiments of the invention, the identification information includes the model number, port count, and/or aggregated LLDP results.

In Step 615, the network device receives one or more identification files from the identification server. In one or more embodiments of the invention, the identification files include one or more YAML files including instructions.

FIG. 7 shows a flowchart according to one or more embodiments of the invention. The method depicted in FIG. 7 may be used to configure a network device in accordance with one or more embodiments of the invention. One or more steps shown in FIG. 7 may be omitted, repeated, and/or performed in a different order among different embodiments.

In Step 700, a network device, running the bootstrap client, extracts configuration action(s)/configuration action set(s) from one or more identification files. As noted with respect to FIG. 6, the identification files include YAML files including instructions. In one or more embodiments of the invention, the configuration action(s)/configuration action set(s) are the YAML files including instructions.

In Step 705, the network device performs the configuration action(s)/configuration action set(s) extracted from the identification files. In one or more embodiments of the invention, the configuration action(s) may be one or more of the following configuration actions: copying a file from a configuration server, e.g. configuration servers (400A-400N) FIG. 1, to the network device, installing an operating system (OS) plugin, configuring an OS plugin, installing an OS extension, validating a version of an OS, sending an email to a recipient, modifying a configuration file, or replacing a configuration file.

Thus, the methods shown in FIGS. 5-7 may be used to, for example, configure a network device. During the configuration process, the network device may interact with a version control server. FIGS. 8 and 10 show methods that may be implemented by a version control server to, for example, configure a network device.

FIG. 8 shows a flowchart according to one or more embodiments of the invention. The method depicted in FIG. 8 may be used to configure a network device in accordance with one or more embodiments of the invention. One or more steps shown in FIG. 8 may be omitted, repeated, and/or performed in a different order among different embodiments.

In Step 800, an identification server receives a message from a network device requesting a bootstrap client.

In Step 810, the identification server sends the bootstrap client to the network device.

FIG. 10 shows a flowchart according to one or more embodiments of the invention. The method depicted in FIG. 10 may be used to identify a network device in accordance with one or more embodiments of the invention. One or more steps shown in FIG. 10 may be omitted, repeated, and/or performed in a different order among different embodiments.

In Step 1000, an identity server receives identification information from a network device. The identification information may include the model number, port count, connectivity information, and/or other information that may identify the network device. In one or more embodiments of the invention, the connectivity information is the aggregated results of the network device performing the LLDP protocol, e.g., each device connected to each port of the network device.

In Step 1010, the identity server determines if the received identification information includes aggregated LLDP results. If the identification information includes LLDP results, the method proceeds to Step 1015. If the identification information does not include LLDP results, the method proceeds to Step 1030.

In Step 1015, the identification server pattern matches the LLDP results to the definitions database. The identification server may perform pattern matching as described with respect to the identification server (200) of FIG. 2.

To perform pattern matching, in one or more embodiments of the invention, the identification server compares the LLDP results to the condition portion of each entry in the definitions database. The condition portion indicates network device connectivity information for each port of the network device. If the LLDP results match the condition portion of the entry, the entry is determined as a match. If the LLDP results do not match the condition portion, the entry is not determined as a match. The identification server repeats the above process for each entry in the definitions database.

The identification checks the availability status of each entry determined as a match. Entries having an availability status of unavailable are determined as not matching. An entry of the remaining matching entries is selected as a match. The matched entry is marked as unavailable. If a match is not made, e.g., no entry includes a matching condition portion and has an availability status of available, the identification server may determine the network device as unknown.

To perform pattern matching, in one or more embodiments of the invention, the identification server compares the LLDP results to the condition portion of each entry in the definitions database having an availability status of available. The condition portion indicates network device connectivity information for each port of the network device. If the LLDP results match the condition portion of the entry, the entry is determined as a match. If the LLDP results do not match the condition portion, the entry is not determined as a match. The identification server may repeat the above process for each entry in the definitions database marked as available until a match is made. If a match is not made, e.g., no entry has an availability status of available and includes a matching condition portion, the identification server may determine the network device as unknown.

In Step 1020, the identification server generates and sends one or more identification files to the network device. As discussed with respect to FIG. 2A, the identification server may include an identification files generator. The identification files generator may determine a number of configuration actions based on the definitions database entry that was matched in Step 1015. The identification files generator may retrieve configuration actions, e.g., YAML files including instruction, from a version control server, identified by the definitions database entry that was matched. The identification files generator may generate one or more identification files including the retrieved YAML files that include instructions, e.g., the identification files generator may aggregate and/or modify the retrieved YAML files.

If the identification server identifies the network device as unknown, the identification files generator may generate a default set of YAML instructions that prevent the network device from disrupting the surrounding network infrastructure. In one or more embodiments of the invention, the identification server may notify a user, e.g., network administrator, if a network device is identified as unknown.

In Step 1025, the identification server updates the definitions database by marking the entry corresponding to the identified network device as filled.

As noted above in Step 1010, if the identification information does not include LLDP results, the method proceeds to Step 1030. In Step 1030, the identification server pattern matches the model number, port count, or other system identification information received in the identification information to the definitions database. The identification server may perform pattern matching as shown in FIG. 10 or as previously described. More specifically, the identification server compares the model number, port count, or other system identification information to the condition portion of an entry in the definitions database. The condition portion indicates network device the model number, port count, and/or other system identification information. If the received model number, port count, and/or other system identification information match the condition portion, the entry is determined as a match. If the model number, port count, and/or other system identification information do not match the condition portion, the entry is not determined as a match. The identification server may repeat the above process for each entry in the definitions database not marked as filled until a match is made. If no match is made and all of the entries in the definitions database have been considered, the identification server may determine the network device as unknown.

In Step 1035, the identification server generates and sends one or more identification files to the network device. As discussed with respect to FIG. 2A, the identification server include an identification files generator. The identification files generator may determine a number of configuration actions based on the definitions database entry that was matched in Step 1015. The identification files generator may retrieve YAML instructions from a version control server, identified by the definitions database entry. The identification files generator may generate one or more identification files including the retrieved YAML instructions. The method then proceeds to Step 1025.

The method shown in FIG. 10 may include the interaction of an identification server and a version control server. Specifically, the method may include retrieving version controlled configuration actions, by an identification server, from a version control server.

FIG. 9 shows a flowchart according to one or more embodiments of the invention. The method depicted in FIG. 9 may be used to generate a version controlled configuration action in accordance with one or more embodiments of the invention. One or more steps shown in FIG. 9 may be omitted, repeated, and/or performed in a different order among different embodiments.

In Step 900, a version control server receives a message from a user, network device, and/or identification server indicating a configuration change to the network device.

In Step 910, the version control server generates a new version of a configuration action(s)/configuration action set(s). In one or more embodiments of the invention, the new version of the configuration action is stored as an entry in an action database of the version control server. In one or more embodiments of the invention, the new version is one or more YAML instructions reflecting the configuration change of the network device.

Figure 11:
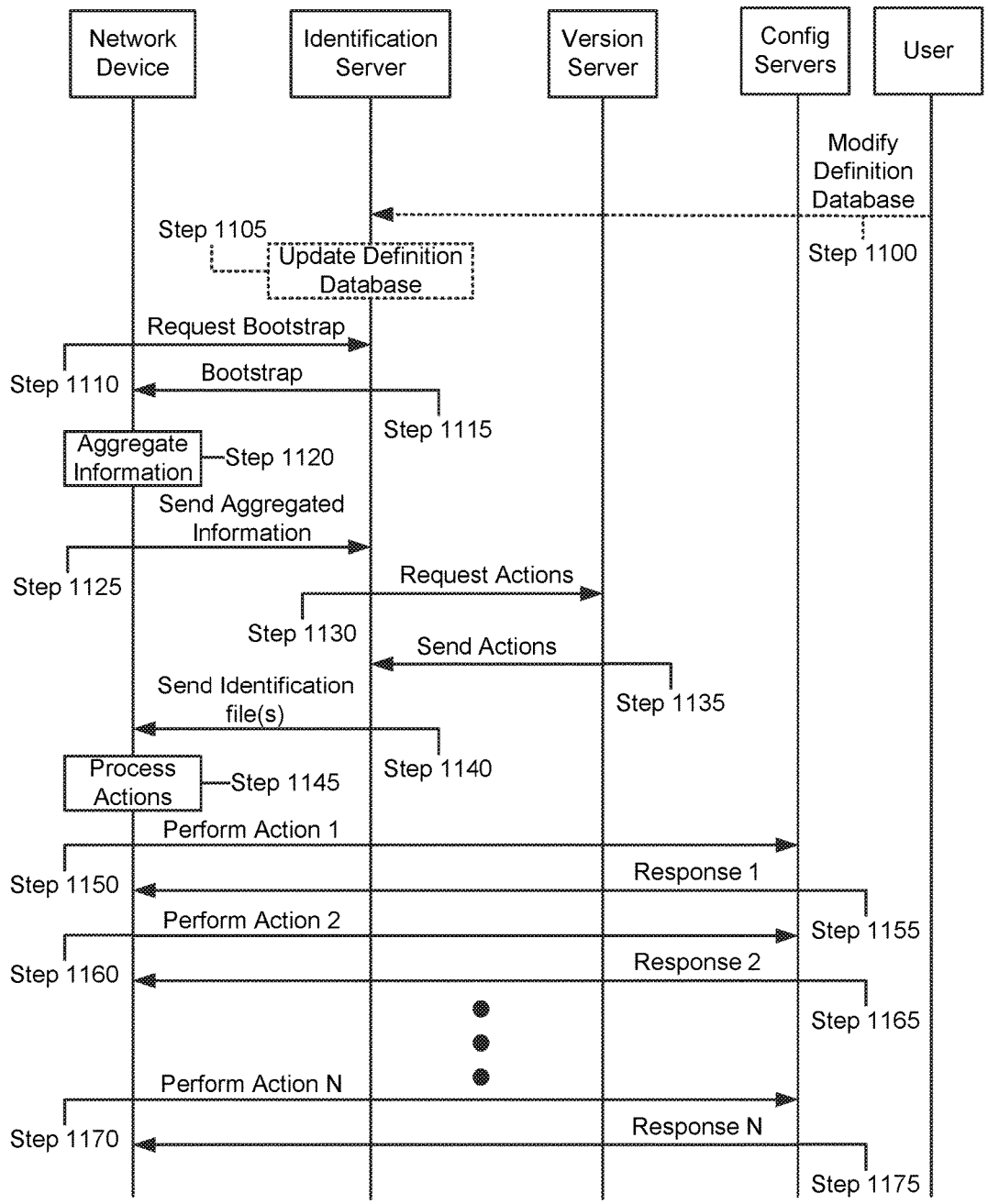
FIG. 11 shows a flowchart of a method of configuring a network device in accordance with one or more embodiments of the invention.
Figure 12:
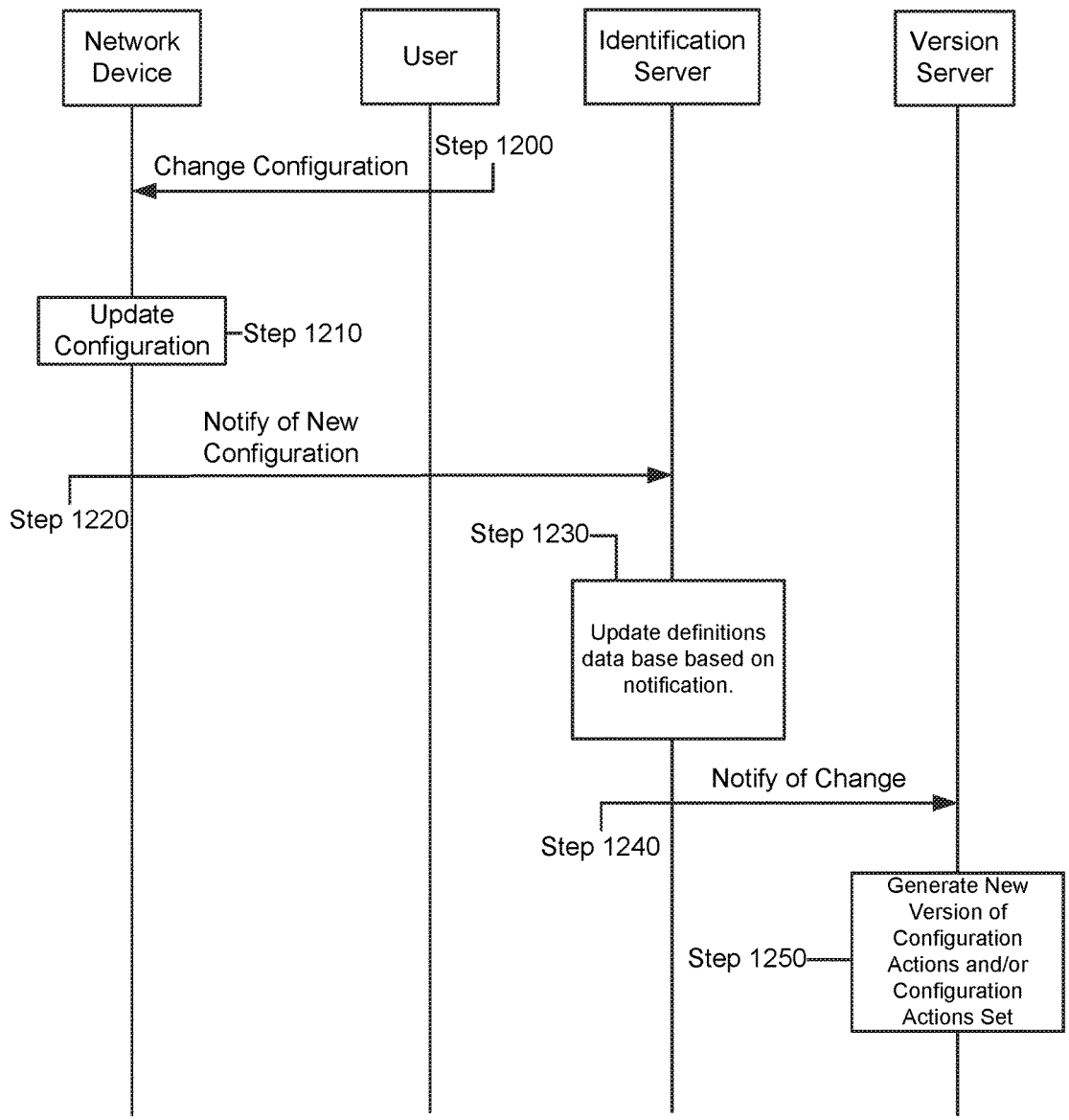
FIG. 12 shows a flowchart of a method of generating version controlled configuration action(s) and/or configuration action sets(s) in accordance with one or more embodiments of the invention.

In FIGS. 11 and 12, action diagrams are shown. The action diagrams indicate interactions between components of the system shown in FIGS. 1-4.

FIG. 11 shows an action diagram according to one or more embodiments of the invention. The action diagram of FIG. 11 shows an example of adding a network device to a network. As will be described below in greater detail with reference to FIG. 11, a network device may be connected to a number of other network devices when the network device is powered-on. The network device may not be configured to operate within the network when powered-on and may need to be configured to operate within the network, e.g., as a core, spine, or leaf element. An identification server may identify the network device and provide identification files to the network device. The network device may configure itself based on the identification files.

The actions depicted in FIG. 11 may be used to configure a network device in accordance with one or more embodiments of the invention. One or more steps shown in FIG. 11 may be omitted, repeated, and/or performed in a different order among different embodiments.

In one embodiment of the invention, the action diagram shown in FIG. 11 may begin at Step 1100. For example, the action diagram may begin at Step 1100 if a network device is being replaced.

In another embodiment of the invention, the action diagram shown in FIG. 11 may begin at Step 1110. For example, the action diagram may begin at Step 1110 if a network device is being installed as part of a network deployment.

In Step 1100, a user may send a message to an identification server including a modification to an entry in a definitions database stored on the identification server. The modification may modify the configuration actions and/or configuration action set of the entry. For example, as described with respect to FIGS. 2B and 2D, each entry of the definitions database may include a configuration actions or a configuration action set. Each of the configuration actions and/or configuration action set may be version controlled, e.g., multiple versions of the configuration actions and/or configuration action sets may be stored on a version control server. The modification of the configuration actions and/or configuration action sets to point to a desired version of the configuration actions and/or configuration action sets. The desired version may be an older version of the configuration actions and/or configuration action sets stored on the version control server.

In Step 1105, the identification server may receive the message including the modification and modify the entry in the definitions database based on the modification.

In Step 1110, a network device may power-on and request a bootstrap client from the identification server.

In Step 1115, the identification server may receive the request from the network device an send the bootstrap client to the network device.

In Step 1120, the network device may receive and load the bootstrap client. The bootstrap client may aggregate identification information of the network device. The identification information may include the model number, port count, and/or aggregated LLDP results.

In Step 1125, the network device may send the identification information to the identification server.

In Step 1130, the identification server may receive the identification information from the network device. The network device may perform pattern matching as described with respect to FIG. 10. Based on the results of the pattern matching, the network device may send a message to a version control server requesting configuration actions and/or configuration action set.

In Step 1135, the version control server may receive a message from the identification server requesting configuration action and/or configuration action sets. As described with respect to FIGS. 3A, 3B, and 10, the version control server may determine a version of one or more configuration actions and/or configuration action sets based on the received requests.

For example, as described with respect to steps 1100 and 1105, a user may modify an entry in the definitions database to indicate a desired version of a configuration action and/or configuration action set. Thus, in one or more embodiments of the invention, the request may indicate a desired version of a configuration action and/or configuration action set stored on the version control server.

In response to the request, the version control server may send the version controlled configuration action and/or configuration action set to the identification server.

In Step 1140, the identification server may receive the configuration action and/or configuration action set from the version control server. The identification server may aggregate and/or modify one or more received configuration actions and/or configuration action sets to generate one or more identification files. The identification server may send the one or more identification files to the network device.

In Step 1145, the network device may receive the one or more identification files from the identification server. The network device may process the received identification files. As described above with respect to FIGS. 1 and 4, the identification files may be YAML files including instructions. Each of the instruction may cause the network device to retrieve one or more files from one or more configuration servers and perform actions. Performing the instructions may configure the network device to operate within a network environment.

In Steps 1150, 1160, and 1170, the network device may request one or more files from the one or more configuration servers, as described in Step 1145.

In Steps 1155, 1165, and 1175, the configuration servers may send the files to the network device in response to the requests.

FIG. 12 shows an action diagram according to one or more embodiments of the invention. The action diagram of FIG. 12 shows an example of modifying a configuration of a network device within a network. As will be described below in greater detail with reference to FIG. 12, a configuration of a network device located in a network may be changed by a user. The change in configuration of the network device may be recorded and stored. By recording and storing the change to the network device, a replacement network device may be configured.

The actions depicted in FIG. 12 may be used to generate version controlled actions in accordance with one or more embodiments of the invention. One or more steps shown in FIG. 12 may be omitted, repeated, and/or performed in a different order among different embodiments.

In Step 1200, a user may send a message to a network device indicating a change in the configuration of the network device.

In Step 1210, the network device may receive the message from the user and update the configuration of the network device based on the receive change.

In Step 1220, the network device may send a message to an identification server indicating the change in configuration of the network device.

In Step 1230, the identification server may update a definitions database entry based on the notification. More specifically, as described with respect to FIGS. 2B and 2D, the entry may include configuration actions and/or configuration action sets. The identification server may update the configuration actions and/or configuration action sets portion of the entry based on the notification.

In Step 1240, the identification server may notify a version control server of the change to the entry in the definitions database.

In Step 1250, the version control server may generate a new version of the configuration actions and/or configuration action sets based on the received notification. As described with respect to FIGS. 3A and 3B, the version control server may include version controlled configuration actions and/or configuration action sets in an action database. The version control server may generate a new entry in the action database base on the received notification.

Those skilled in the art will appreciate that while the invention has been described using YAML, other languages may be used without departing from the invention.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of configuring a network device, comprising:
    obtaining, by a version control server, a first configuration action;
    matching, by the version control server, the first configuration action to a first entry of an action database of the version control server;
    sending, by the version control server, a version controlled configuration action of the first entry;
    obtaining, from an identification server, a second configuration action;
    identifying a second entry of the action database associated with the second configuration action;
    generating a new entry of the action database based at least in part on the second configuration action; and
    associating the new entry with the second entry.

2. The method of claim 1, wherein the first configuration action comprises an action and at least one attribute.

3. The method of claim 2, wherein the action indicates one selected from a group consisting of copying a file from a configuration server, installing an operating system (OS) plugin, configuring an OS plugin, installing an OS extension, validating a version of an OS, sending an email to a recipient, modifying a configuration file, and replacing a configuration file.

4. The method of claim 2, wherein the at least one attribute indicates one selected from a group consisting of an operating system, a version of an operating system, an operating system extension, an operating system plugin, a configuration file, and a script configured to send an email to a recipient.

5. The method of claim 1, further comprising:
obtaining, by the version control server, a third configuration action;
matching, by the version control server, the third configuration action to a third entry of an action database of the version control server; and
sending, by the version control server, a version controlled configuration action of the third entry.

6. The method of claim 5, wherein the third configuration action comprises an action and at least one attribute.

7. The method of claim 1, wherein the version controlled configuration action specifies an action used in a process of configuring a server, wherein the version controlled configuration action is associated with a configuration state of the server after the action is performed.

8. A version control server, comprising:
an action database stored on a storage of the version control server; and
a version generator configured to generate a version controlled action based on a configuration update of a network device,
wherein the action database comprises entries that specify actions used in a process of configuring a server and each entry of the action database is associated with a state of the server after the action of the entry is performed, and
wherein the version control server is configured to:
obtain, from an identification server, a configuration action;
identify an existing entry of the action database associated with the configuration action;
generate a new entry of the action database based at least in part on the configuration action; and
associate the new entry with the existing entry.

9. The version control server of claim 8, wherein the configuration update is received in a notification from the identification server.

10. The version control server of claim 8, wherein the configuration update comprises at least one configuration action executed by the network device.

11. The version control server of claim 10, wherein the action database comprises a first entry indicating a first version of the at least one configuration action and a second entry indicating a second version of the at least one configuration action.

12. The version control server of claim 11, where the first version of the at least one configuration action is different from the second version of the at least one configuration action.

13. The version control server of claim 12, wherein the first version of the at least one configuration action comprises an action and at least one attribute,
wherein the action indicates one selected from a group consisting of copying a file from a configuration server, installing an operating system (OS) plugin, configuring an OS plugin, installing an OS extension, validating a version of an OS, sending an email to a recipient, modifying a configuration file, and replacing a configuration file,
wherein the at least one attribute indicates one selected from a group consisting of an operating system, a version of an operating system, an operating system extension, an operating system plugin, a configuration file, and a script configured to send an email to a recipient.

14. The version control server of claim 13, wherein the second version of the at least one configuration action comprises a second action and a second at least one attribute,
wherein the second action indicates one selected from a group consisting of copying a file from a configuration server, installing an operating system (OS) plugin, configuring an OS plugin, installing an OS extension, validating a version of an OS, sending an email to a recipient, modifying a configuration file, and replacing a configuration file, and
wherein the second at least one attribute indicates one selected from a group consisting of an operating system, a version of an operating system, an operating system extension, an operating system plugin, a configuration file, and a script configured to send an email to a recipient.

15. The version control server of claim 8, wherein generating a version controlled action comprises:
obtaining an updated configuration action;
identifying an existing entry of the action database associated with the updated configuration action;
generating a new entry of the action database based on, at least in part, the configuration action; and
associating the new entry with the existing entry.

16. A non-transitory computer readable medium storing instructions which, when executed by a version control server, cause the version control server to:
obtain a first configuration action;
match the first configuration action to a first entry of an action database;
send a first version controlled configuration action of the first entry;
obtain, from an identification server, a second configuration action;
identify a second entry of the action database associated with the second configuration action;
generate a new entry of the action database based at least in part on the second configuration action; and
associate the new entry with the second entry.

17. The non-transitory computer readable medium storing instructions of claim 16, wherein the first configuration action comprises an action and at least one attribute
wherein the action indicates one selected from a group consisting of copying a file from a configuration server, installing an operating system (OS) plugin, configuring an OS plugin, installing an OS extension, validating a version of an OS, sending an email to a recipient, modifying a configuration file, and replacing a configuration file,
wherein the at least one attribute indicates one selected from a group consisting of an operating system, a version of an operating system, an operating system extension, an operating system plugin, a configuration file, and a script configured to send an email to a recipient.

18. The non-transitory computer readable medium storing instructions of claim 16, wherein the instructions further cause the version control server to:
  obtain a third configuration action;
  match the third configuration action to a third entry of an action database of the version control server; and
  send a second version controlled configuration action of the third entry.

19. The non-transitory computer readable medium storing instructions of claim 16, wherein:
  the first version controlled configuration action specifies an action used in a process of configuring a server, and
  the first version controlled configuration action is associated with a configuration state of the server after the action is performed.

* * * * *